United States Patent

Olaru

(10) Patent No.: US 6,739,863 B2
(45) Date of Patent: May 25, 2004

(54) VALVE PIN WITH THERMOCOUPLE

(76) Inventor: George Olaru, 2470 Bayview Avenue, Toronto, Ontario (CA), M2L 1A7

( * ) Notice: Subject to any disclaimer, the term of this patent is extended or adjusted under 35 U.S.C. 154(b) by 0 days.

(21) Appl. No.: 10/268,885

(22) Filed: Oct. 11, 2002

(65) Prior Publication Data

US 2003/0072833 A1 Apr. 17, 2003

Related U.S. Application Data

(60) Provisional application No. 60/328,404, filed on Oct. 12, 2001.

(51) Int. Cl.[7] .............................................. B29C 45/23
(52) U.S. Cl. ..................................... 425/564; 425/566
(58) Field of Search ................................. 425/547, 549, 425/562–566

(56) References Cited

U.S. PATENT DOCUMENTS

| 4,222,733 A | * | 9/1980 | Gellert et al. ............... 425/566 |
| 4,276,015 A | | 6/1981 | Rogers |
| 4,330,258 A | | 5/1982 | Gellert |
| 4,521,179 A | * | 6/1985 | Gellert ........................ 425/566 |
| 4,611,394 A | | 9/1986 | Gellert |
| 4,663,811 A | * | 5/1987 | Gellert ........................ 425/566 |
| 4,705,473 A | * | 11/1987 | Schmidt ...................... 425/549 |
| 4,711,625 A | | 12/1987 | Knauer et al. |
| 4,820,147 A | | 4/1989 | Gellert |
| 5,049,062 A | * | 9/1991 | Gellert ........................ 425/549 |
| 5,106,291 A | | 4/1992 | Gellert |
| 5,118,279 A | | 6/1992 | Gellert |
| 5,136,141 A | | 8/1992 | Trakas |
| 5,225,211 A | | 7/1993 | Imaida et al. |
| 5,238,391 A | | 8/1993 | Teng |
| 5,284,436 A | | 2/1994 | Gellert |
| 5,334,008 A | | 8/1994 | Gellert |
| 5,346,388 A | | 9/1994 | Gellert |
| 5,387,099 A | * | 2/1995 | Gellert ........................ 425/564 |
| 5,695,793 A | * | 12/1997 | Bauer ......................... 425/564 |
| 5,795,599 A | | 8/1998 | Gellert |

FOREIGN PATENT DOCUMENTS

| EP | 0 963 829 A1 | 12/1999 |
| JP | 03203194 | 2/1993 |
| JP | 2001088169 | 4/2001 |
| WO | WO 98/19846 | 5/1998 |
| WO | WO 01/03905 | 1/2001 |

* cited by examiner

*Primary Examiner*—Tim Heitbrink
(74) *Attorney, Agent, or Firm*—Bereskin & Parr

(57) ABSTRACT

A valve pin for use in a melt channel in an injection molding machine. The valve pin has a valve pin body and at least one thermocouple substantially completely inside the valve pin body.

13 Claims, 11 Drawing Sheets

VALVE PIN WITH THERMOCOUPLE

FIELD OF THE INVENTION

This invention relates to an injection molding machine, and more particularly to a valve pin for a nozzle in an injection molding machine.

BACKGROUND OF THE INVENTION

It is well known that it is desirable to measure the temperature of the melt throughout the length of a nozzle on a hot runner injection molding machine, and at the gate into a mold cavity.

Several attempts at taking this measurement have been made. Typically, a thermocouple is included on the nozzle and is mounted to the exterior of the nozzle body. In order to take measurements that better represent the condition of the melt, the tip of the thermocouple is usually positioned within an aperture that penetrates into the nozzle body so that the tip of the thermocouple is positioned nearer to the nozzle melt channel. The accuracy of the thermocouple is hampered, however, by the proximity of the thermocouple to the nozzle heater, which is typically positioned on the exterior of the nozzle. Thus, the proximity of the thermocouple to the nozzle heater itself prevents the thermocouple from accurately measuring the temperature of the melt.

Another example of an attempt to measure the melt temperature at the gate is disclosed in European Patent Application EP 99304442.9 (Goldwin et al.). Goldwin et al. discloses the use of a conductive film to coat the outside of a valve pin that passes through the nozzle melt channel. The conductive film could be used to measure the temperature of the melt in the nozzle melt channel. However, the film is repeatedly exposed to a cycling of pressures, and is constantly abraded by the melt flowing through the nozzle into the mold cavity.

Yet another example of an attempt to measure the melt temperature at the gate is disclosed in U.S. Pat. No. 5,334,008 (Gellert). Gellert discloses a thermocouple, having a sensing portion that is fixed inside a valve pin guiding element in a melt channel. The guiding element divides the melt flow, however, and creates an obstruction in the melt channel. Furthermore, the thermocouple is fixed within the melt channel, and cannot therefore obtain temperatures from different positions within the melt channel.

For some applications, it may be advantageous to measure a plurality of temperatures. For example, in some co-injection applications, where there are flows of more than one melts into a mold cavity, it may be desirable to measure the temperatures of some of the melts individually, and/or some of the melts after they have combined. In order to achieve this using fixed thermocouples of the prior art, a plurality of thermocouples may be needed to be incorporated into the co-injection nozzle. In the event that one of the thermocouples fails for any reason, it can be relatively difficult to access the failed thermocouple to replace it.

Thus a need exists for new devices for the measuring of the temperature of the melt at the gate into a mold cavity in a hot runner injection molding machine.

SUMMARY OF THE INVENTION

In a first aspect, the present invention is directed to a valve pin for use in a melt channel in an injection molding machine, including a valve pin body and at least one thermocouple positioned substantially completely inside the valve pin body for measuring the temperature of melt in the melt channel.

In a second aspect, the present invention is directed to a nozzle for an injection molding machine, incorporating the valve pin described above.

In a third aspect, the present invention is directed to a method of making a valve pin for use in a melt channel in an injection molding machine, the method comprising:

providing a valve pin body having a chamber therein;

inserting thermocouple substantially completely into the chamber; and at least partially filling the chamber with a retainer to retain the thermocouple therein.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
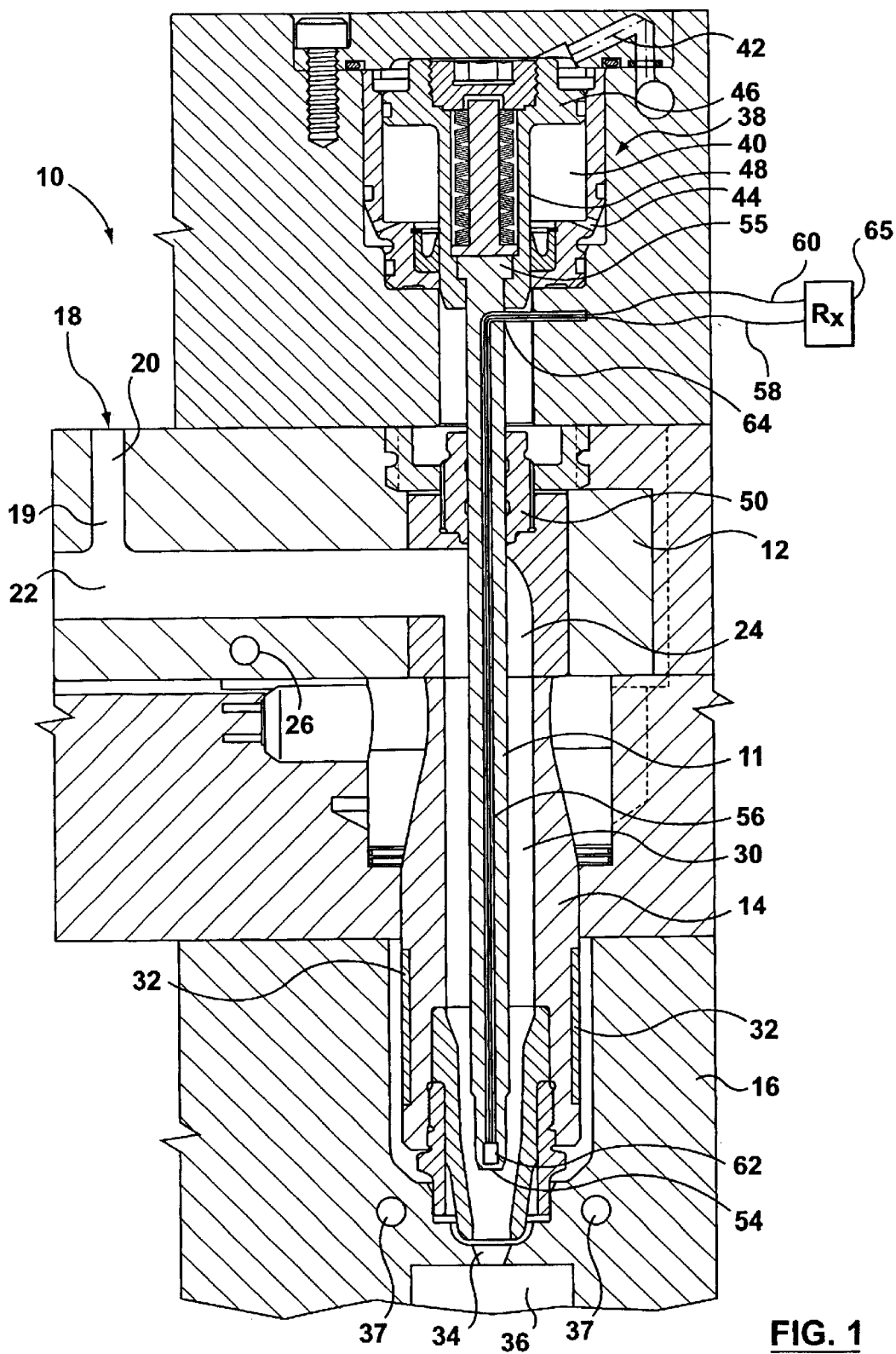
FIG. 1 is a sectional view of a portion of an injection molding machine, which has a nozzle and a valve pin in accordance with a first embodiment of the present invention, the valve pin being in the open position.
Figure 2:
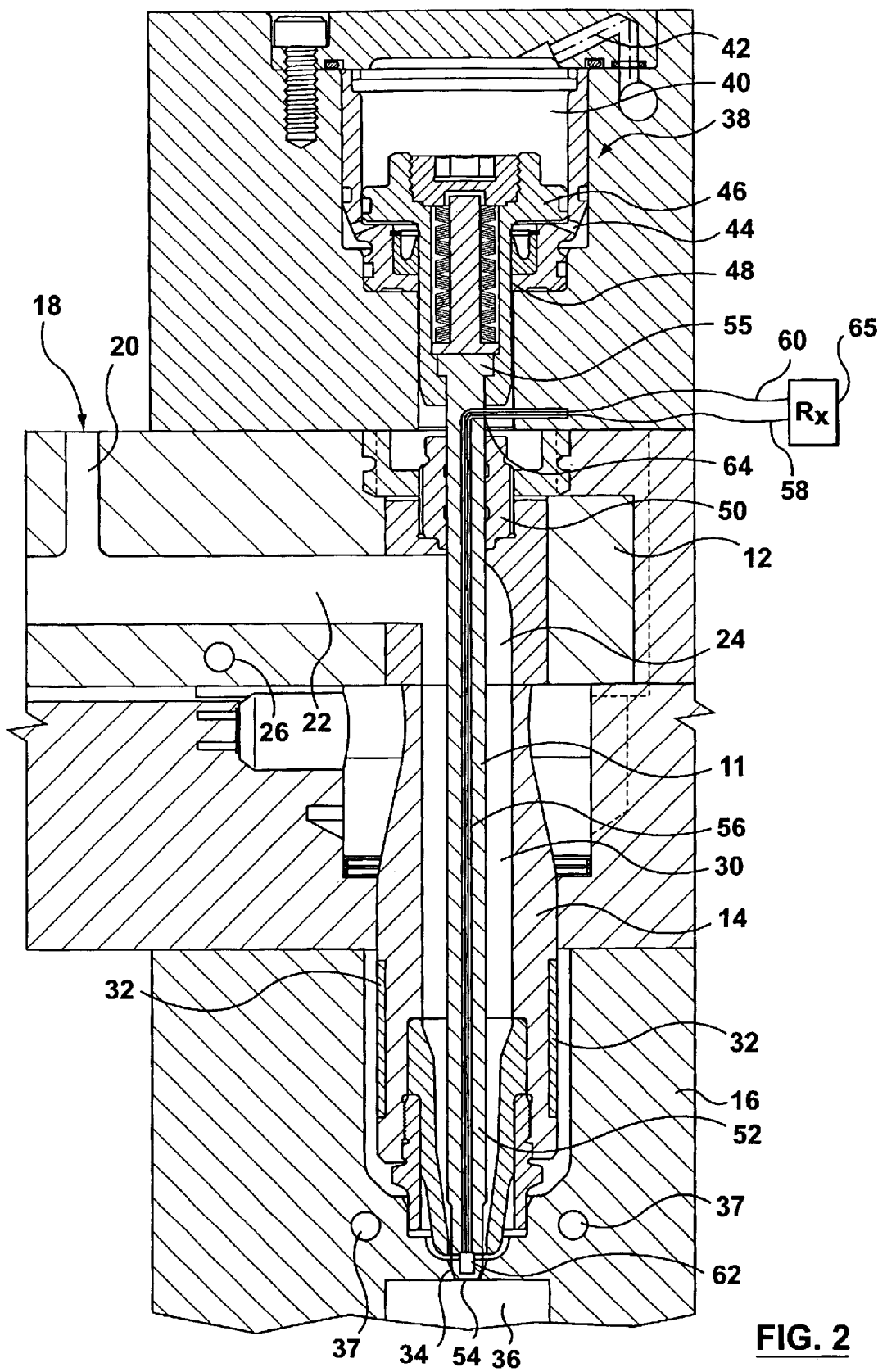
FIG. 2 is a sectional view of the portion of the injection molding machine shown in FIG. 1 with the valve pin in the closed position.

Reference is made to FIGS. 1 and 2, which show an injection molding machine 10 having a valve pin 11 in accordance with a first embodiment of the present invention. Injection molding machine 10 includes a manifold block 12, a plurality of nozzles 14 and a mold cavity block 16. The manifold block 12 may have many possible melt channel configurations. For example, as shown in FIG. 1, the manifold block 12 may include an inlet 18, and a plurality of melt channels 19, including an inlet melt channel 20, a plurality of intermediate melt channels 22 downstream from the inlet melt channel 20 and a plurality of outgoing melt channels 24 downstream from the intermediate melt channels 22. The manifold block 12 is heated by a heater 26. Heater 26 may be any suitable type of manifold heater known in the art.

The nozzles 14 are positioned downstream from the outgoing melt channels 24. Each nozzle 14 includes a nozzle body 28, which has a nozzle melt channel 30 therein. The nozzle 14 is heated by a nozzle heater 32, which may be mounted to the nozzle 14 in any way known in the art. For example, nozzle heater 32 may surround the exterior of the nozzle body 28, as shown in FIG. 1, or alternatively, nozzle heater 32 may be embedded within nozzle body 28. The nozzle melt channel 30 ends at a gate 34, which is the entrance from the nozzle melt channel 30 into a mold cavity 36 in the mold cavity block 16. Mold cavity block 16 may be cooled by a cooling fluid in cooling channels 37.

Melt passes from a melt source (not shown), through inlet 18 in manifold block 12, through melt channels 20, 22 and 24, through the nozzle melt channels 30 and through gates 34 into mold cavities 36.

Valve pins 11 are positioned within the nozzle melt channels 30 to control the flow of melt into the mold cavities 36. Valve pins 11 may be movable within the nozzle melt channel 30, as shown, by an actuator 38. Alternatively, valve pins 11 may be stationary within nozzle melt channel 30.

Actuator 38 may be any suitable type of actuator. For example, actuator 38 may include a chamber 40, having a first fluid passage 42 proximate one end of the chamber 40, a second fluid passage 44 proximate the opposing end of the chamber 40, a piston 46 in the chamber 40 and a arm 48 extending from the piston 46 to outside the chamber 40. The arm 48 may connect the piston 46 inside the chamber 40 to the valve pin 11, using any suitable connection means. For several reasons including ease of cleanout, the arm 48 preferably connects to the valve pin 11 outside of any melt channels 19 and 30, so that the melt is not permitted to seep into the connection. The arm 48 itself may be fixedly connected to the piston 46.

A fluid, such as, for example, hydraulic oil or air, may be introduced into the chamber 40 on one side of the piston 46 at a selected pressure and/or removed on the opposing side of the piston 46 to move the piston 46, (and in turn, the arm 48 and the valve pin 11), in a direction either towards or away from the gate 34. The movement of the valve pin 11 towards and away from the gate 34 may be, for example, to control the melt flow into the mold cavity 36.

The valve pin 11 passes from outside the outgoing melt channel 24 into the outgoing melt channel 24 through a mold plug 50. Mold plug 50 seals around valve pin 11 to inhibit melt from escaping from outgoing melt channel 24. The mold plug 50 may further permit sliding of the valve pin 11 therethrough, so that valve pin 11 can move, as desired in melt channels 24 and/or 30. In the position shown in FIG. 1, valve pin 11 is in the open position, that is, the position in which melt flow is permitted into mold cavity 36.

Valve pin 11 includes a valve pin body 52, which has an end 54. The end 54 may be tapered, as shown in FIGS. 1 and 2, or alternatively, may have any suitable shape, such as cylindrical. The end 54 may be used for gating purposes, ie. for the closing of the gate 34. In the position shown in FIG. 2, the valve pin 11 is in the closed position, with the end 54 being positioned in the gate 34, to prevent melt flow into mold cavity 36.

Valve pin 11 may further include a head 55. The head 55 may be used to facilitate connecting the valve pin 11 to the piston 46. The head 55 may be positioned at the end of the valve pin 11 opposed to the end 54. The head 55 may be a disc-shaped portion that has a larger diameter than that of the valve pin body 52. The head 55 may be captured by any suitable means known in the art, so that the valve pin 11 is removable from the arm 48.

Valve pin 11 further includes a thermocouple 56. The thermocouple 56 may be a two-wire type. For example, the thermocouple 56 may include a first electrical conduit 58, which may be a wire 58, a second electrical conduit 60, which may be a wire 60, and a sensing piece 62, which connects the wires 58 and 60 at one end. The wires 58 and 60 are preferably insulated along their length, to inhibit being heated by something other than the sensing piece 62. The thermocouple 56 may be of a configuration described in U.S. Pat. No. 5,009,718 (Schmidt), which is incorporated herein by reference.

Thermocouple 56 may be embedded in valve pin body 52, as shown, or may alternatively, may extend in an internal passage in valve pin body 52.

The sensing piece 62 may be positioned proximate the end 54 of the valve pin body 52 to record the temperature of melt that is relatively close to the gate 34. The term 'proximate' as used herein, indicates that the sensing piece 62 may be near end 54 or may be in the end 54.

The wires 58 and 60 from thermocouple 56 may exit from the valve pin body 52 outside of the nozzle melt channel 30 and manifold outgoing melt channel 24. Thermocouple 56 exits from valve pin 11 at an exit point 64. Exit point 64 may be at any suitable position on valve pin 11, such as, for example, on the side of the valve pin body 52, as shown. The position of exit point 64 should be such that the exiting wires 58 and 60 do not interfere with the movement of valve pin 11 in melt channels 24 and 30. Thermocouple 56 may be connected to a receiving device 65 for receiving, processing, transmitting and/or recording the measurements from thermocouple 56. Wires 58 and 60 should be long enough between valve pin 11 and receiving device 65, so that they do not interfere with the movement of valve pin 11.

By positioning the thermocouple 56 inside the valve pin body 52, the thermocouple 56 can measure the temperature of the melt while it is protected from wear from the melt flow in the nozzle melt channel 30. This is in contrast to valve pins having a film-type thermocouple applied thereto where substantially all of the film-type thermocouple is exposed to the melt flow.

Figure 3:
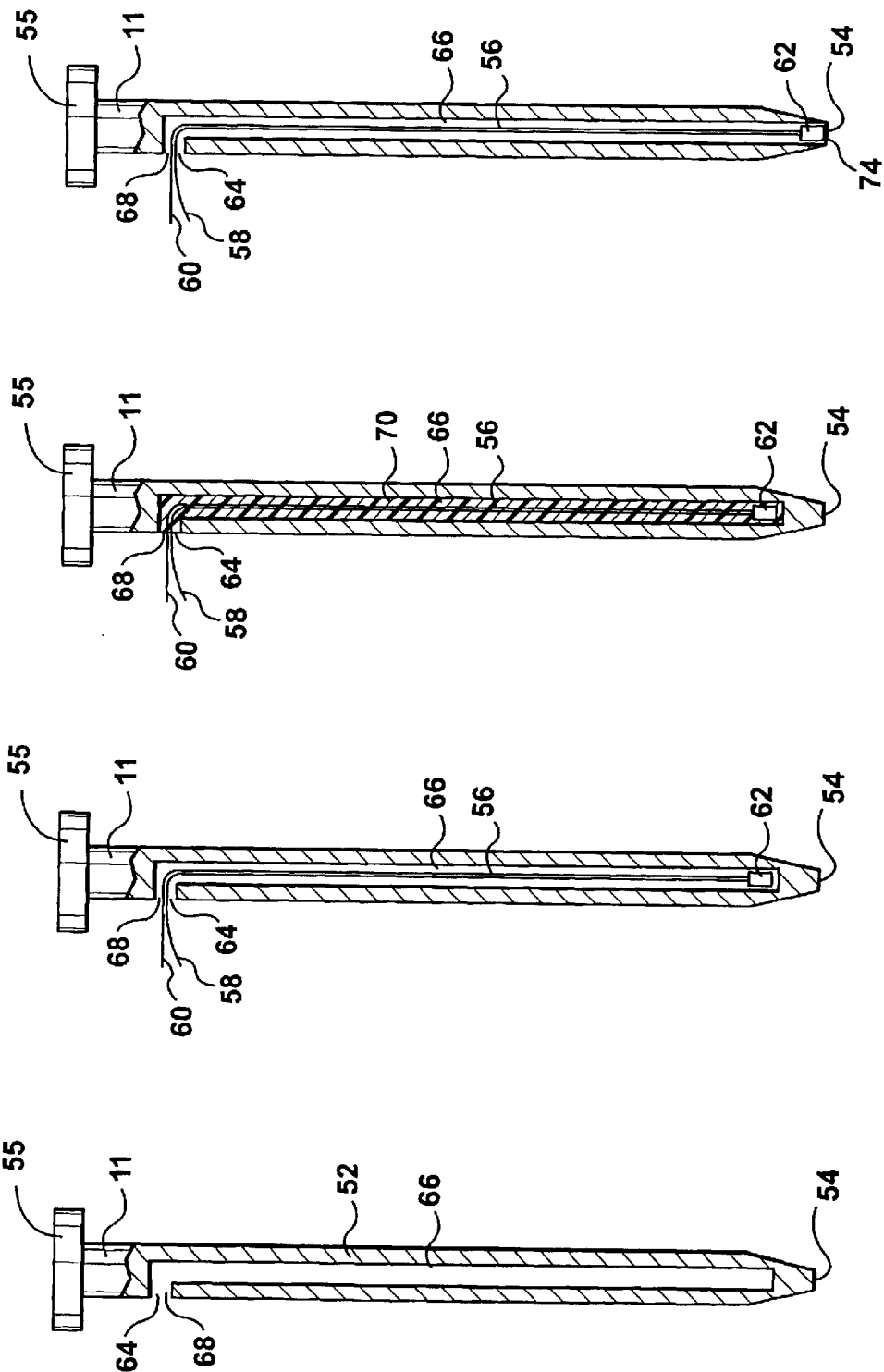
FIGS. 3a, 3b and 3c are sectional views showing the construction of the valve pin shown in FIG. 1.
FIG. 3d is a side view of a valve pin in accordance a second embodiment of the present invention.

Reference is made to FIGS. 3a, 3b and 3c, which illustrate a method in accordance with the present invention, for making valve pin 11. Reference is made to FIG. 3a. To make a valve pin 11 having a thermocouple 56, a passage 66 may be made in valve pin body 52. Passage 66 may be cast directly into the valve pin body 52, or may be machined into valve pin body 52. Passage 66 may be blind and may therefore end internally in valve pin body 52 at any suitable point, such as, for example, proximate to end 54, as shown in FIG. 3a. Aperture 68 is the opening of passage 66 to the exterior of the valve pin 11. Aperture 68 may be positioned at any suitable point on valve pin 11. Aperture 68 may act as the exit point 64 for the wires 58 and 60 from valve pin body 52.

Referring to FIG. 3b, the thermocouple 56 may be fed into passage 66 so that the sensing piece 62 is positioned at the blind end of passage 66. Referring to FIG. 3c, the passage 66 may be filled fully or partially with a retainer 70, to hold the thermocouple 56 in place in passage 66. The retainer 70 may be thermally conductive, so that it increases the thermal conductivity between the sensing piece 72 and the melt flow surrounding the valve pin 11, relative to an air gap that would otherwise surround the thermocouple 56 in the passage 66. The increased thermal conductivity increases the accuracy of the thermocouple 56 in reading the temperature of the melt flow around the valve pin 11. After filling the passage 66 with the retainer 70, the retainer 70 may be solidified as necessary to prevent the thermocouple 56 from being inadvertently moved in the valve pin 11 during use.

Reference is made to FIG. 3d. As an alternative, valve pin body 52 may include a passage 72, which passes through end 54 of valve pin 11, so that there is an aperture 74 on the end 54 of valve pin 11. In this alternative, the thermocouple 56 may pass through the aperture 74, so that the sensing piece 62 of thermocouple 56 is flush with the surface of the valve pin at end 54. A suitable material may then be used to fill any air gap between the sensing piece 62 in the aperture 74, so that the end 54 of the valve pin 11 has a smooth surface.

Figure 4:
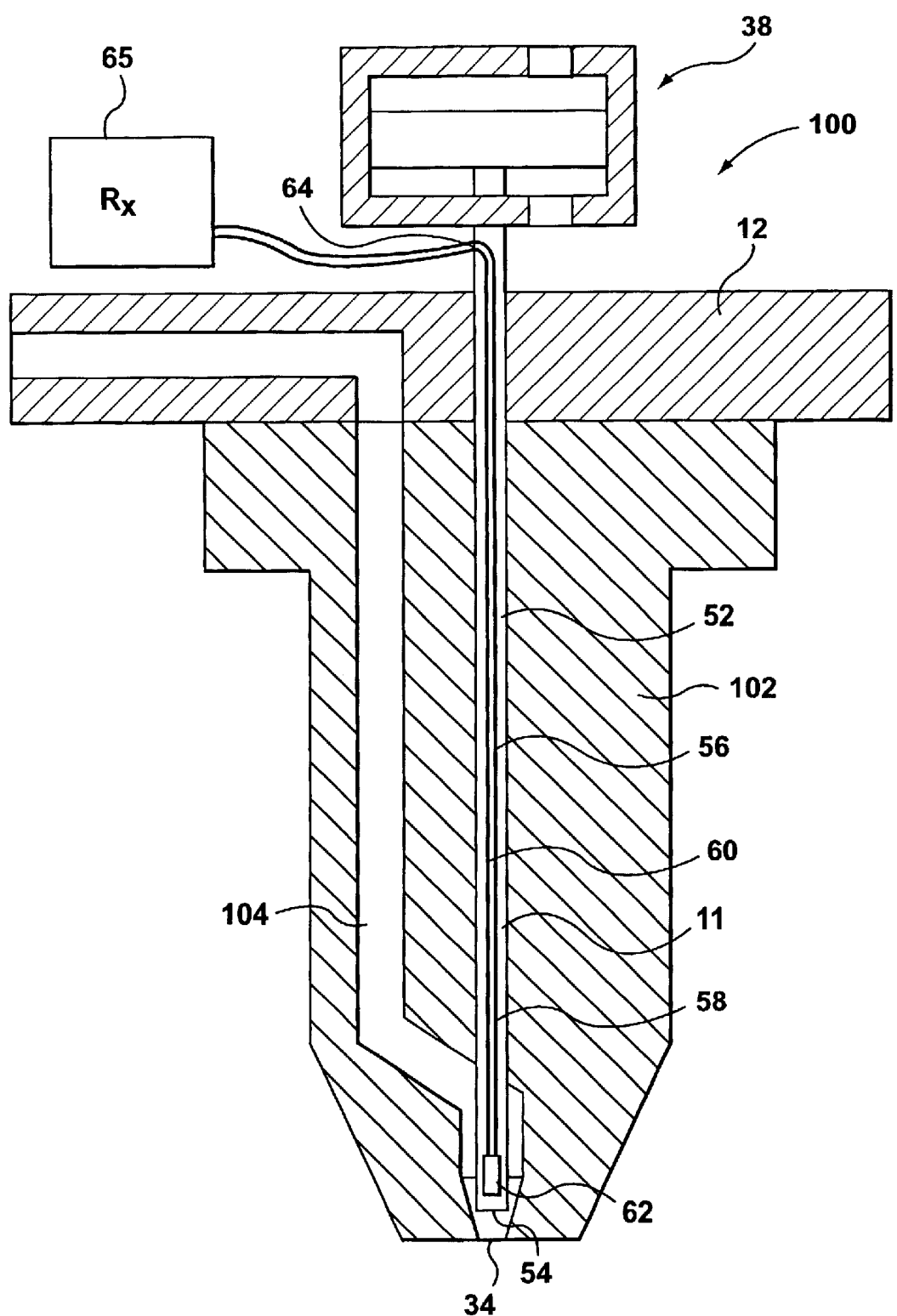
FIG. 4 is a sectional view of the portion of an injection molding machine including the valve pin shown in FIG. 1 and another nozzle.

Reference is made to FIG. 4, which shows valve pin 11 in use with a nozzle 100. Nozzle 100 is similar to nozzle 14, except that nozzle 100 may have a nozzle body 102 with an offset nozzle melt channel 104. Valve pin 11 may pass through manifold 12, through nozzle body 102 and into nozzle melt channel 104. Valve pin 11 may be actuated by actuator 38 or may alternatively be stationary within nozzle melt channel 104.

Figure 5:
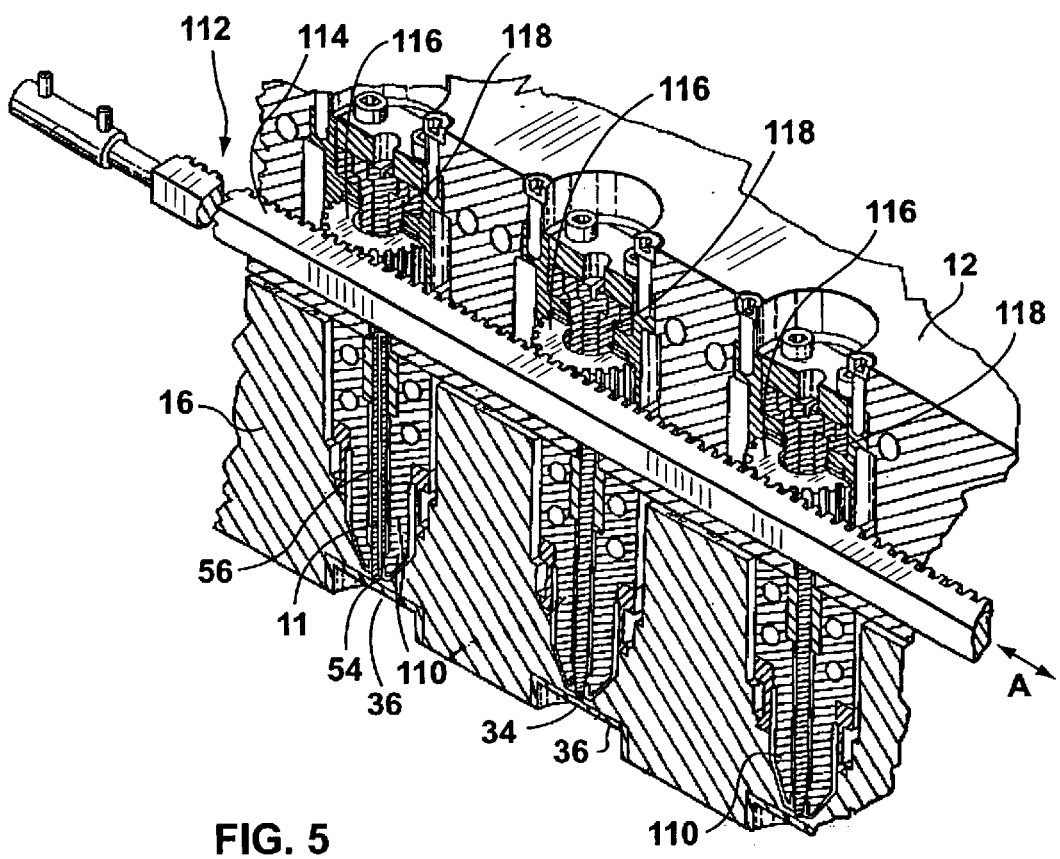
FIG. 5 is a sectional view of the portion of an injection molding machine including the valve pin shown in FIG. 1 and yet another nozzle.

Reference is made to FIG. 5, which shows a valve pin 11 in use with a nozzle 110. Nozzle 110 is similar to nozzle 14, except that nozzle 110 includes an actuator 112, which replaces actuator 38. Actuator 112 is a rack-and-pinion type actuator, and includes a rack 114, a plurality of pinions 116, and a plurality of valve pin holders 118. The rack 114 may move laterally relative to the nozzles 110, along the line of direction shown by arrows A, and engages the pinions 116, which are mounted onto the valve pin holders 118. The pinions 116 and the valve pin holders 118 rotate in response to the lateral movement of the rack 114. The valve pin 11 in this case, rotates to control the flow of melt to the gate 34, rather than moving towards and away from the gate 34. A rack-and-pinion actuator construction that may be used with the valve pin 11 having the thermocouple 56 therein, is described further in U.S. Pat. No. 4,330,258 (Gellert), which is hereby incorporated by reference. It is alternatively possible for a separate rack to be provided for each pinion. As a further alternative, it is possible for the rack or racks to be positioned other than laterally.

Figure 6:
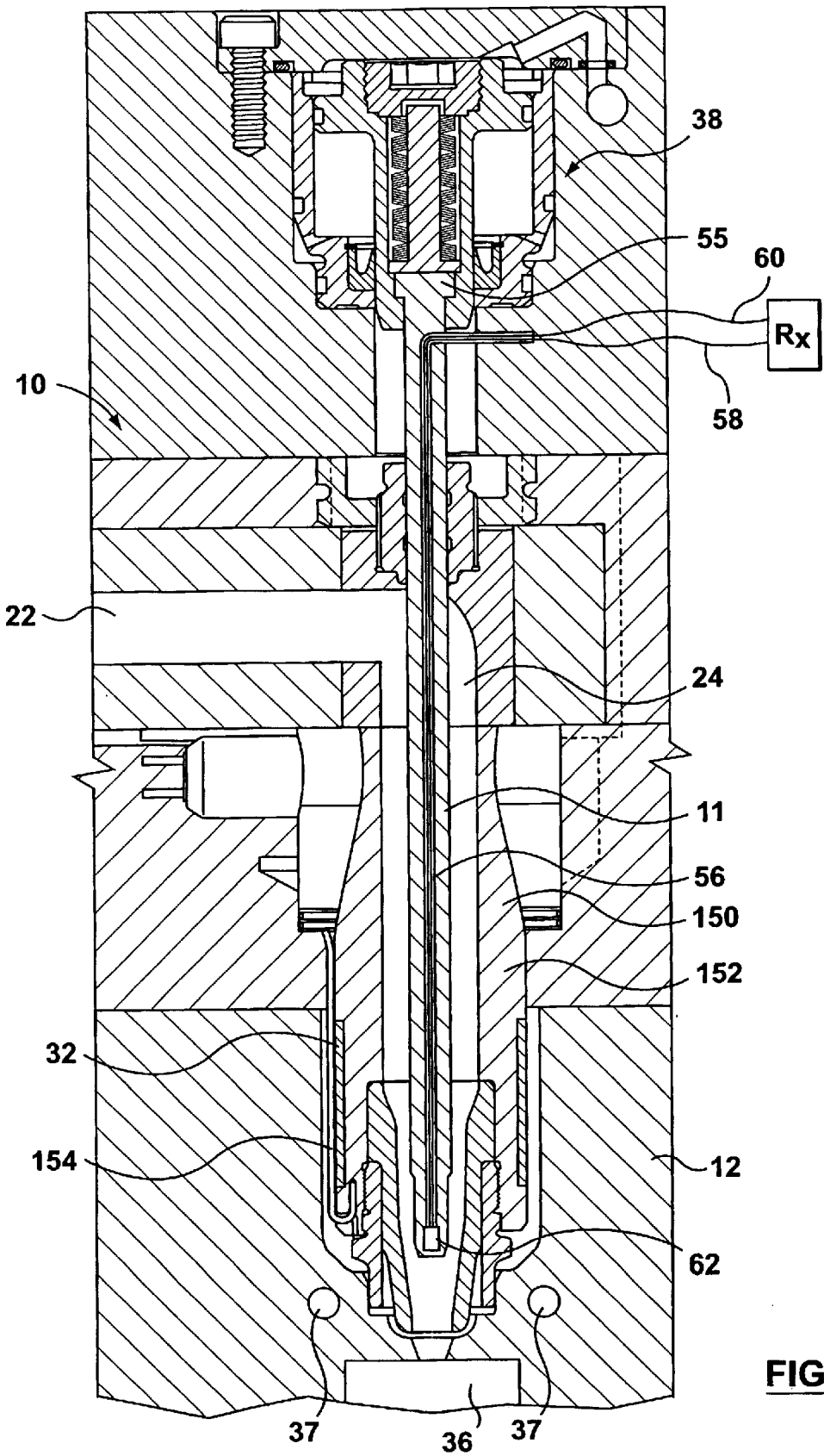
FIG. 6 is a sectional view of the portion of an injection molding machine including the valve pin shown in FIG. 1 and yet another nozzle.

Reference is made to FIG. 6, which shows a nozzle 150 with the valve pin 11 in accordance with the present invention. Nozzle 150 is similar to nozzle 14, except that nozzle 150 includes a body 152 having a second thermocouple 154 connected thereto. Thermocouple 154 may be used to measure the temperature of some portion of the nozzle 150 itself. For example, the thermocouple 154 may be used to measure the temperature of the nozzle body 152 or the temperature of the nozzle heater 32.

Figure 7:
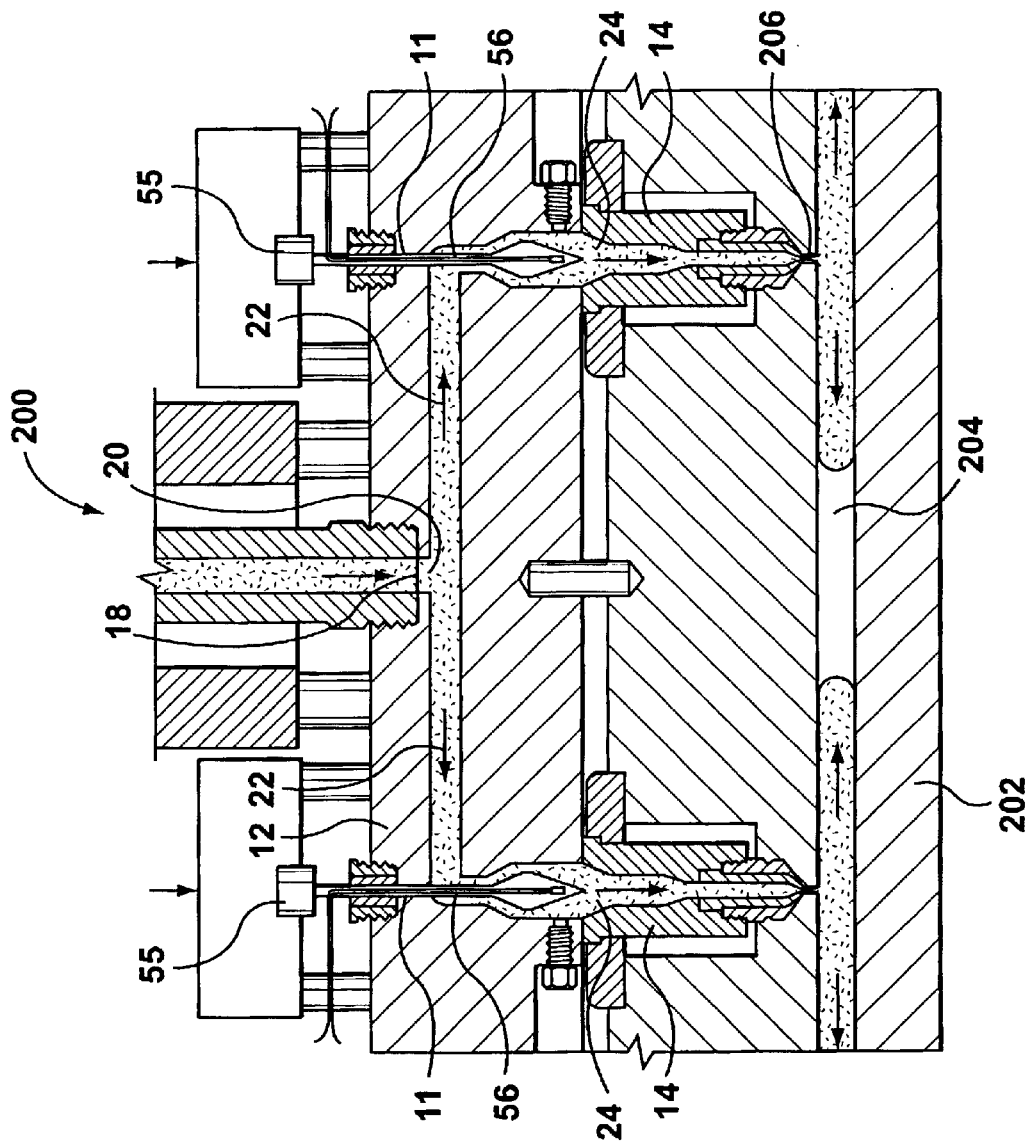
FIG. 7 is a sectional view of the portion of a multigate injection molding machine including the nozzle and the valve pin shown in FIG. 1.

Reference is made to FIG. 7, which shows a multi-gate injection molding machine 200. Molding machine 200 may include a mold cavity plate 202 with a plurality of mold cavities 204. Each mold cavity 204 may have a plurality of gates 206 permitting entry of melt into mold cavity 204 from a plurality of points. Molding machine 200 may further include manifold 12, and a plurality of nozzles 14, whereby more than one nozzle 14 may feed melt to a single mold cavity 204. Valve pins 11 may be included in molding machine 200, to provide melt temperature information from each nozzle 14 leading to a mold cavity 204.

Figure 8A:
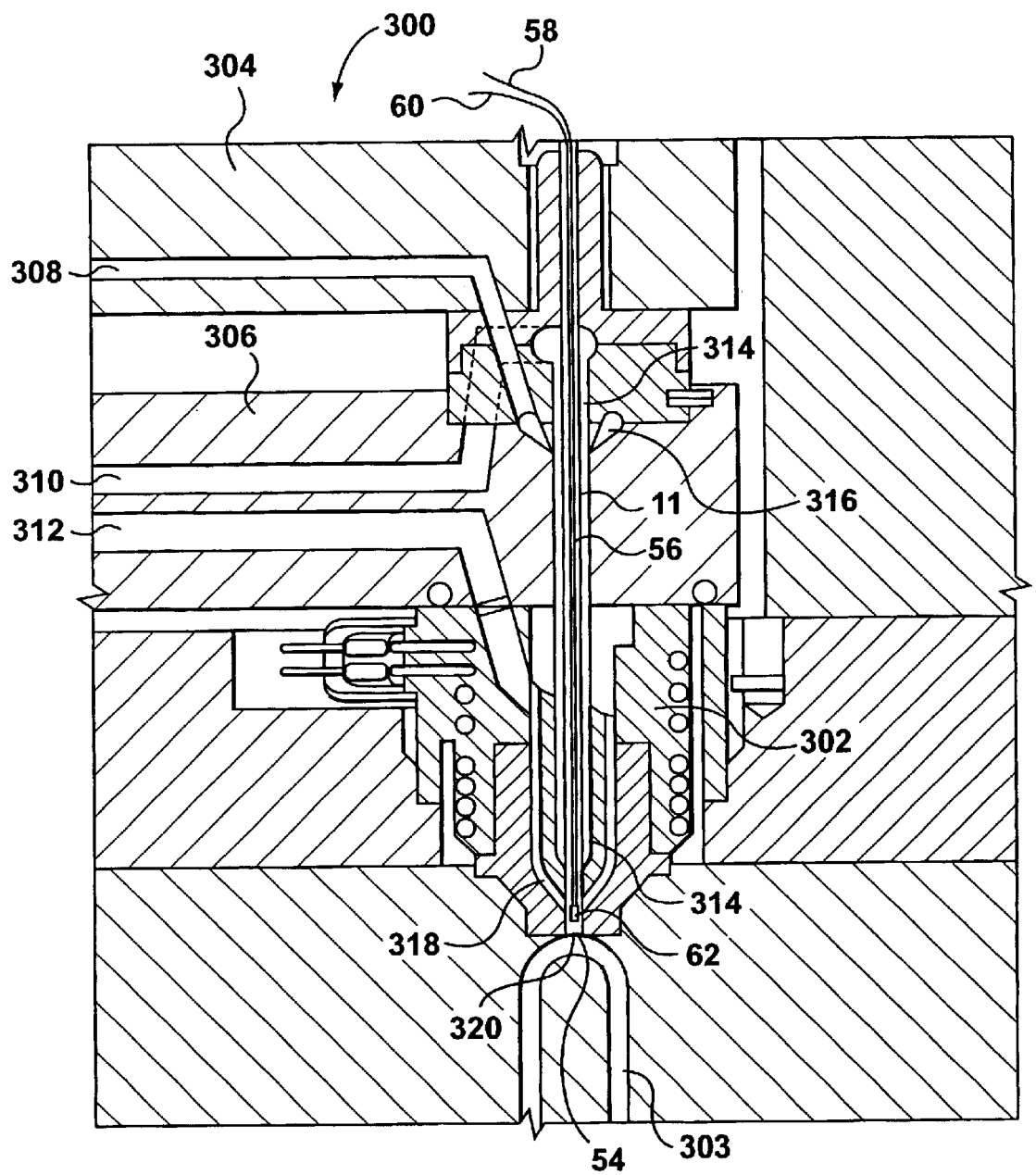
FIGS. 8a, 8b, and 8c are sectional views of a portion of a co-injection injection molding machine including the valve pin shown in FIG. 1 and yet another nozzle.
Figure 8B:
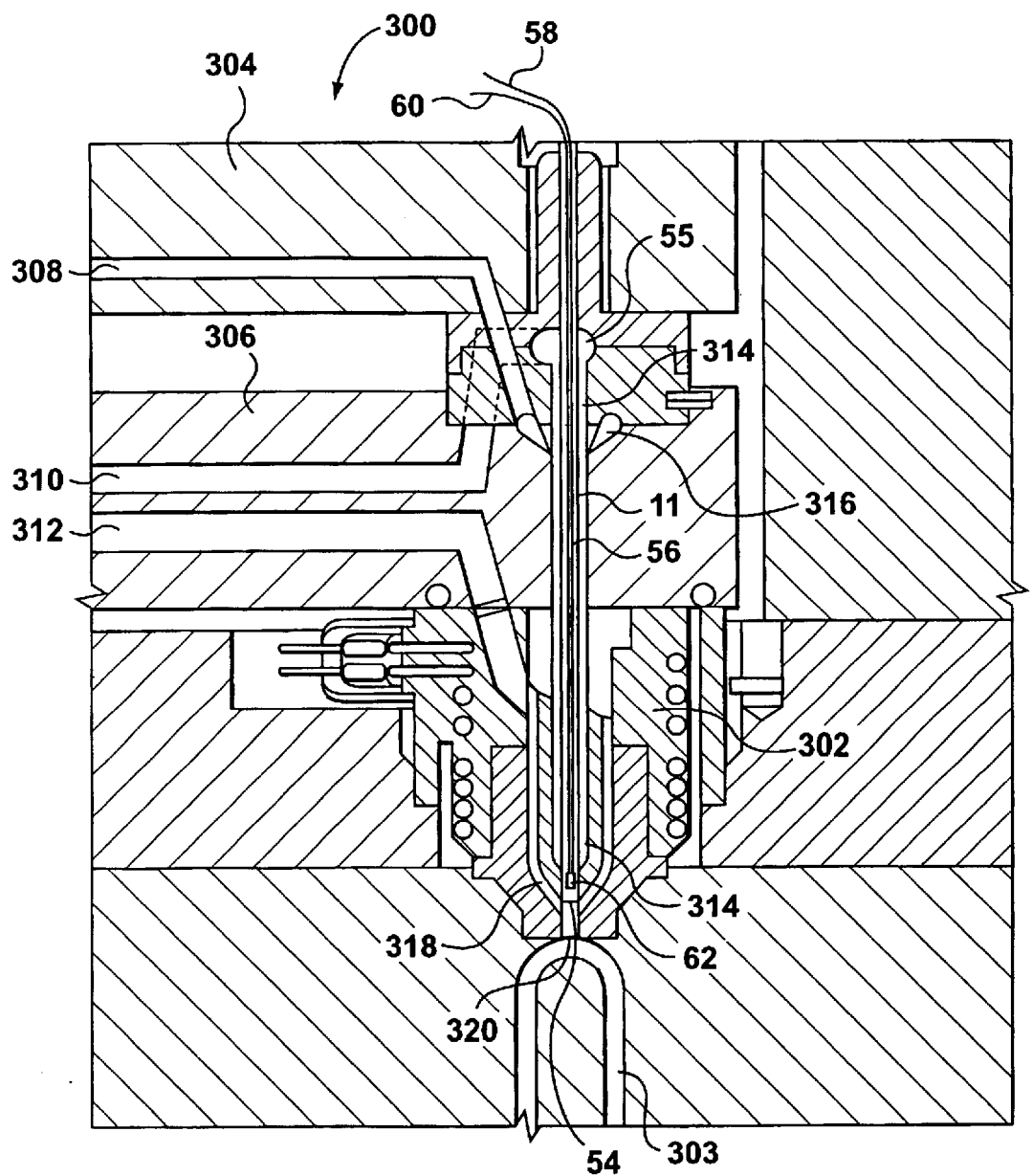
Figure 8C:
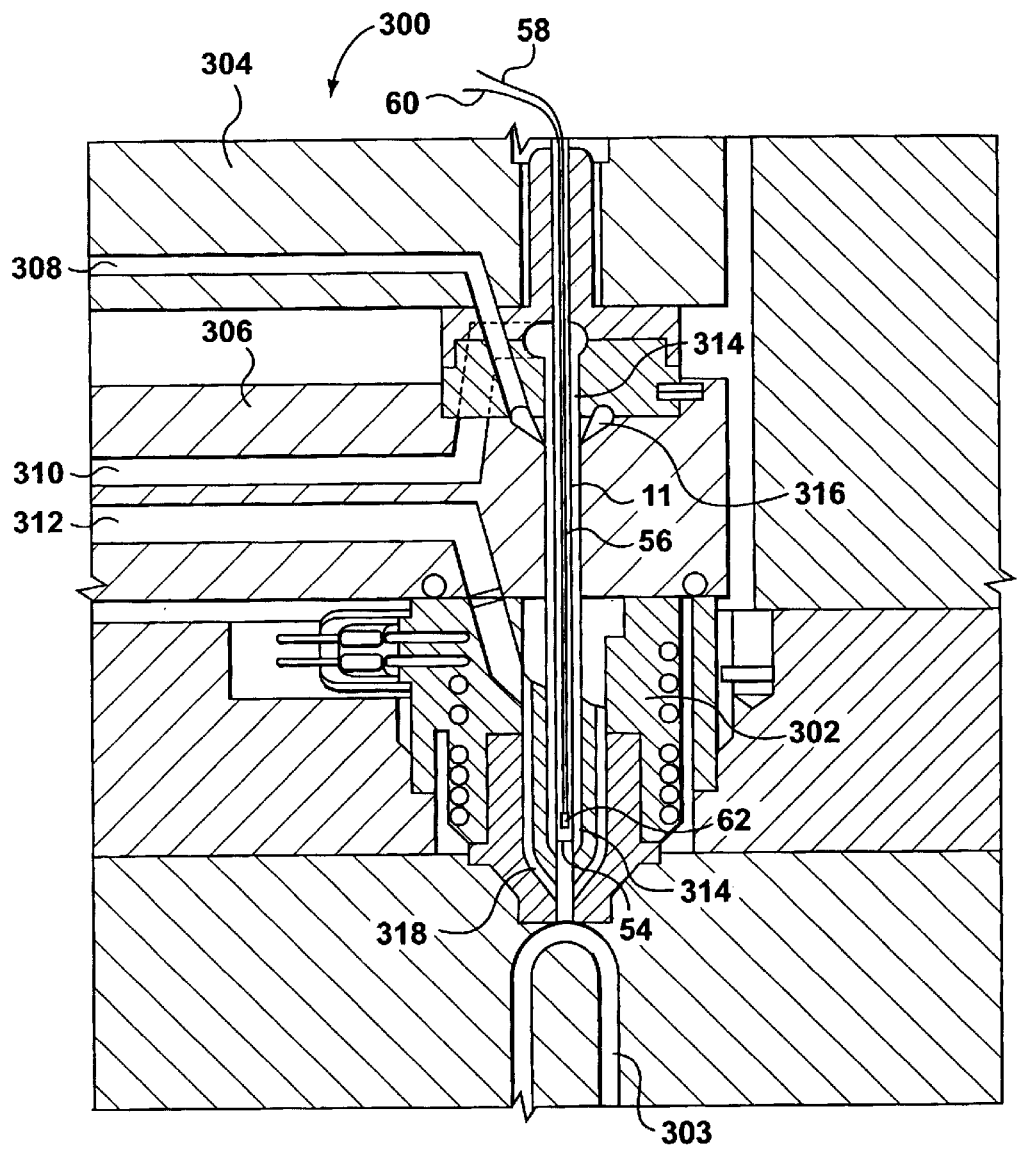

Reference is made to FIGS. 8a, 8b and 8c, which show a co-injection molding machine 300 with a co-injection nozzle 302. Co-injection is the injection of different materials into a single mold cavity 303 to form, for example, a product having several layers. Some of the layers may be made from the same material, and some layers may be made from a different material. Some layers may flow into the mold cavity 303 simultaneously, while some layers may flow into the mold cavity 303 sequentially. Co-injection is used for many applications, such as preforms for soft drink bottles.

Molding machine 300 may include a plurality of manifolds, such as manifolds 304 and 306. Manifolds 304 and 306 receive melt from a plurality of melt sources (not shown), and may have a plurality of melt channels therein, which are shown at 308, 310 and 312. Each melt channel 308, 310 and 312 carries melt which forms a different layer of the final molded product.

Co-injection nozzle 302 may include a first nozzle melt channel 314, a second nozzle melt channel 316 and a third nozzle melt channel 318, which receive melt from manifold melt channels 308, 310 and 312 respectively. Such a configuration is described in PCT publication no. WO00/54954 (Gellert et al.). Nozzle melt channel 314 may be central and coherent along its length, while melt channel 316 may be annular and may join with melt channel 314, so that a second layer of material may be introduced into melt channel 314. Melt channel 318 may also be annular and join melt channel 314 to introduce a third layer of material to melt channel 314.

Valve pin 11 may be moved in melt channel 314 to permit the flow of the materials into the melt channel 314 or to permit the flow of materials into the mold cavity 303. As valve pin 11 moves in melt channel 314, different temperature information may be obtained. For example, as the valve pin 11 is in the closed position, shown in FIG. 8a, thermocouple 56 may obtain temperature information on the melt in the mold cavity 303, and particularly on the material in the gate area 320 of the mold cavity 303. Such temperature information can be useful, for example, to help control the rate of cooling of the mold cavity. It is advantageous to control the rate of cooling, to inhibit crystallinity development in the molded part. As the valve pin 11 moves to the position shown in FIG. 8b, the thermocouple 56 can obtain information on the melt flow from nozzle melt channel 318. As the valve pin 11 moves to the position shown in FIG. 8c, the thermocouple 56 can obtain temperature information on the melt in melt channel 314 received from melt channels 308 and 310.

Figure 9:
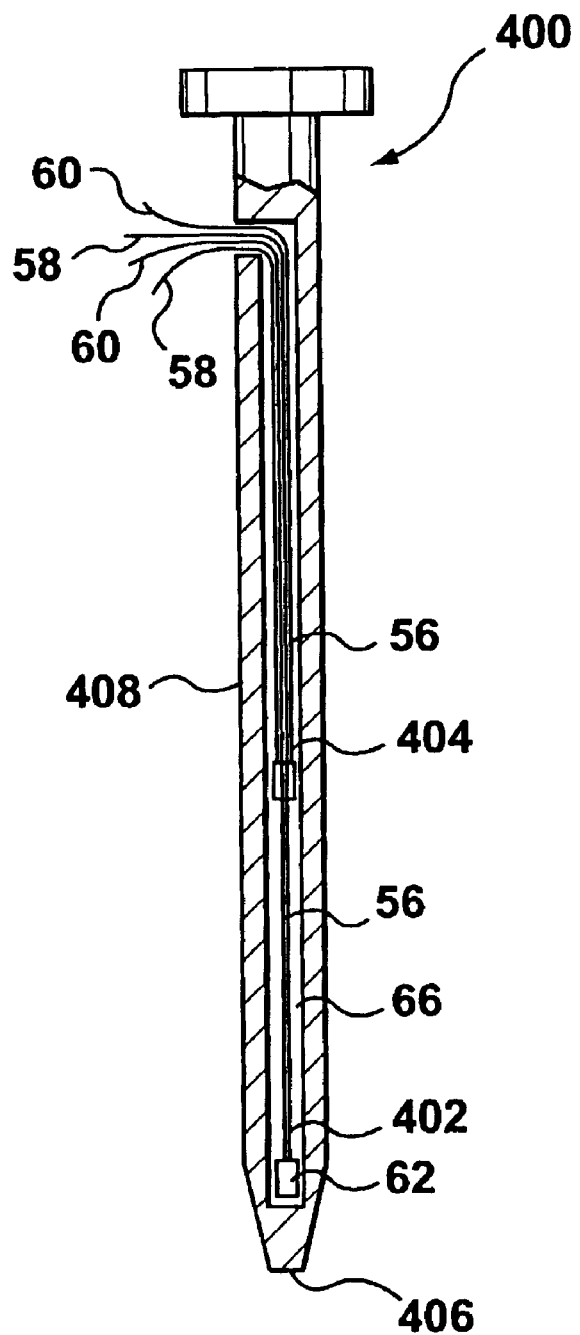
FIG. 9 is a sectional side view of a valve pin in accordance with a third embodiment of the present invention.

Reference is made to FIG. 9, which shows a valve pin 400. Valve pin 400 is similar to valve pin 11, except that valve pin 400 includes a plurality of thermocouples 56. Thermocouples 56 may be positioned at different points within valve pin 400, so that temperature information may be obtained on different portions of a single melt flow, or different melt flows.

Referring to FIG. 1, for example, the temperature of a nozzle, such as the nozzle 14, typically varies over its length. Typically, the nozzle 14 is hottest in the middle, and is cooler at the ends where it contacts the manifold block 12 and the mold cavity plate 16 respectively, due to their lower temperatures. Because of the temperature variation, it may be useful to measure the temperature of melt at different points in the nozzle melt channel 30 simultaneously. By incorporating a plurality of thermocouples 56 in the valve pin 400 (FIG. 9), the melt temperature can be known simultaneously at a plurality of points along the length of the nozzle melt channel 30.

Referring to FIG. 9, a first thermocouple 402, and a second thermocouple 404 may be provided in the valve pin 400. The first thermocouple 402 may be positioned at or near the end of the valve pin 400, which is shown at 406. The end 406 may be used for gating purposes, and may cooperate with the 34 (FIG. 1) to seal against melt flow into the mold cavity 36 (FIG. 1).

The second thermocouple 404 may be positioned spaced from the first thermocouple 402, such as, for example, in a central portion 408 of the valve pin 400. The central portion 408 is the portion of the valve pin 400 that is adapted to be positioned generally in the region of the nozzle 14 (FIG. 1) the hotter central portion of the nozzle 14, which is spaced from its two ends, where the nozzle 14 contacts the mold cavity plate 16 and the manifold plate 12.

The actuator 38 has been described as being a hydraulic piston-type, and as a rack-and-pinion type. Alternatively, the actuator 38 may be an electric rotary actuator, or an electric linear actuator, which can be connected to the valve pin 11.

While the above description constitutes the preferred embodiments, it will be appreciated that the present invention is susceptible to modification and change without departing from the fair meaning of the accompanying claims.

What is claimed is:

1. A valve pin for use in a melt channel in an injection molding machine, comprising:
   a valve pin body; and
   at least one thermocouple positioned substantially completely inside said valve pin body for measuring the temperature of melt in said melt channel.

2. A valve pin as claimed in claim 1, wherein said at least one thermocouple includes a sensing portion and a pair of electrical conduits for connecting said sensing portion to a receiving device.

3. A valve pin as claimed in claim 2, wherein said valve pin body has an end that is adapted to be positioned proximate a gate into a mold cavity, and said sensing portion of said at least one thermocouple is positioned in said end.

4. A valve pin as claimed in claim 3, wherein said sensing portion of said at least one thermocouple is adapted to be exposed to melt when said valve pin body is positioned in said melt channel.

5. A valve pin as claimed in claim 4, wherein said sensing portion of said at least one thermocouple is flush with said end.

6. A valve pin as claimed in claim 2, wherein said valve pin includes a first said thermocouple and a second said thermocouple, and said sensing portion of said first thermocouple is spaced from said sensing portion of said second thermocouple.

7. A valve pin as claimed in claim 6, wherein said valve pin body has an end that is adapted to be positioned proximate a gate into a mold cavity, and said sensing portion of said first thermocouple is positioned proximate said end.

8. A valve pin as claimed in claim 1 further comprising an actuator for moving said valve pin body in said melt channel.

9. The valve pin as claimed in claim 8, wherein said valve pin body is removably connected to said actuator.

10. A nozzle for an injection molding machine, comprising:
    a nozzle body defining a nozzle melt channel therein, wherein said nozzle melt channel is adapted to transfer melt from a melt source, to a gate into a mold cavity;
    a valve pin positioned at least partially in said nozzle melt channel, said valve pin including a valve pin body and at least one valve pin thermocouple positioned at least partially within said valve pin body; and
    an actuator for moving said valve pin in said melt channel.

11. A nozzle as claimed in claim 10, further comprising:
    a heater connected to said nozzle body, and wherein said heater is located on said nozzle body for heating melt passing through said nozzle melt channel; and
    a nozzle body thermocouple connected to said nozzle body.

12. A nozzle as claimed in claim 10, wherein said actuator includes a chamber and a piston that is movable within said chamber, wherein said valve pin is connected to said piston, said piston has two faces, and said piston is adapted to be moved in said chamber by differential pressure of an actuating fluid in said chamber on said two faces of said piston.

13. A nozzle as claimed in claim 10, wherein said valve pin is removably connected to said actuator.

* * * * *